(12) United States Patent
Evans et al.

(10) Patent No.: US 7,094,967 B2
(45) Date of Patent: Aug. 22, 2006

(54) ELECTRICAL FEEDTHRU

(75) Inventors: Cliff Evans, Newtown, CT (US); Mark William Dalton, Danbury, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/669,535

(22) Filed: Sep. 24, 2003

(65) Prior Publication Data

US 2005/0061530 A1  Mar. 24, 2005

(51) Int. Cl.
 H02G 3/18 (2006.01)
(52) U.S. Cl. ............... 174/65 G; 174/262; 174/153 G
(58) Field of Classification Search ............ 174/65 R, 174/262, 152 R, 151, 153 G, 137 R, 50.56, 174/50.5, 50.6, 50.7, 50.51, 50.52, 50.53, 174/50.54, 50.55, 65 G; 439/927, 660, 55, 439/78, 74, 122; 257/266; 324/755
See application file for complete search history.

(56) References Cited

U.S. PATENT DOCUMENTS

| | | | | |
|---|---|---|---|---|
| 3,148,356 A | * | 9/1964 | Hedden, Jr. ................ 174/262 |
| 3,638,163 A | * | 1/1972 | Loosme ........................ 439/74 |
| 3,975,579 A | * | 8/1976 | Davis et al. ............ 174/153 R |
| 4,654,472 A | * | 3/1987 | Goldfarb .................... 174/52.1 |
| 4,982,055 A | * | 1/1991 | Pollack et al. ............... 174/151 |
| 5,015,207 A | * | 5/1991 | Koepke ........................ 439/78 |
| 5,207,589 A | * | 5/1993 | Lettenmayer ................ 439/122 |
| 5,223,672 A | * | 6/1993 | Pinneo et al. ............... 174/52.4 |
| 5,276,963 A | | 1/1994 | Flanders ....................... 29/852 |
| 5,635,847 A | * | 6/1997 | Seidel ........................ 324/755 |
| 6,111,198 A | * | 8/2000 | Tower ....................... 174/65 R |
| 6,154,103 A | | 11/2000 | Scharen et al. ............... 333/99 |
| 6,251,471 B1 | | 6/2001 | Granoff et al. ............... 427/97 |
| 6,305,975 B1 | | 10/2001 | Steiner ........................ 439/559 |
| 6,384,477 B1 | * | 5/2002 | Yoon et al. .................. 257/697 |
| 6,433,276 B1 | * | 8/2002 | Bellora ..................... 174/50.61 |
| 6,465,729 B1 | | 10/2002 | Granoff et al. ............... 174/18 |
| 6,506,083 B1 | * | 1/2003 | Bickford et al. ............ 439/736 |

OTHER PUBLICATIONS

Beitia et al., "Sensor with A Three-Dimensional Interconnection Circuit", Mar. 21, 2002.*

* cited by examiner

*Primary Examiner*—Angel R. Estrada
(74) *Attorney, Agent, or Firm*—David Larson; Jody Lynn DeStefanis; William L. Wang

(57) ABSTRACT

A method and apparatus for electrically interfacing between two or more distinct environments. The method and apparatus are directed to an electrical feedthru with exterior traces traversing a core. The electrical feedthru may be very small, facilitating its use in MEMS devices. The electrical feedthru may also include an over-mold shaped to create a mechanical seal between the two or more distinct environments without the use of an O-ring. The electrical feedthru is not limited to any particular geometry, it may be adapted to fit between any two environments, and thus the traces are not necessarily parallel to a central axis of the core.

27 Claims, 3 Drawing Sheets

ELECTRICAL FEEDTHRU

FIELD OF THE INVENTION

The present invention relates generally to methods and apparatus for transmitting electrical signals, power, or both. More particularly, the present invention relates to transmitting electrical signals, power, or both across two or more distinct environments.

BACKGROUND OF THE INVENTION

A variety of methods and devices currently exist for passing electrical signals and current across distinct environments. Such devices are commonly referred to as electrical feedthrus. The intent of electrical feedthrus is to facilitate passage of the electrical signals, current, or both across the distinct environments without breaching the integrity of any boundary therebetween. One variety of electrical feedthrus includes epoxy encapsulated transmission lines. The transmission lines are usually centered within the epoxy capsule, with the lines running parallel to the epoxy capsule. The epoxy capsule is generally placed between the two distinct environments, where it maintains isolation between the two environments and insulates the transmission lines. Another variety of electrical feedthrus includes constructing a boundary body between two distinct environments with non-conductive materials, and inserting the transmission lines through the boundary body. The boundary body between the two distinct environments is then sealed by standard sealing techniques, such as the use of an O-ring.

However, these standard electrical feedthrus have a number of drawbacks. The primary problem associated with standard electrical feedthrus is the size. Standard electrical feedthrus are often much too large for many applications, particularly for microelectronics or MEMS (micro-electro-mechanical-systems) packaging. Further, as the number of transmission lines needed increases, the size of the feedthru becomes even larger. In addition, the transmission lines of standard electrical feedthrus must pass through the boundary between distinct environments parallel or almost parallel to an axial centerline of the boundary. And as more feedthrus extend through an electrical feedthru, the body of the electrical feedthru is weakened, sometimes requiring a reduction in operating pressures or other parameters across the two boundaries.

SUMMARY OF THE INVENTION

The present invention addresses the above-described deficiencies and others. Specifically, the present invention provides an electrical feedthru apparatus including a core made of an electrical insulator, the core having an external surface, an electrically conductive transmission line disposed across a portion of the external surface, and an insulating mold disposed over the electrically conductive transmission line and the external surface. The electrically conductive transmission line is bonded within a channel formed in the external surface of the core. Bonding the electrically conductive transmission in the channel facilitates a flush arrangement between the external surface and the electrically conductive transmission line. The core includes an axial centerline, however, at least a portion of the electrically conductive transmission line is not necessarily parallel to the axial centerline.

According to some embodiments, the mold is shaped to fit into a standard swage lock. Therefore, the mold may include a wedge and a shoulder, the shoulder providing a surface for bearing against a tightening fastener. The mold is preferably a polymer, for example PEEK (polyetheretherketone). The core may be made of injection molded plastic.

The electrical feedthru includes a microchip adhered to the core according to some embodiments, such that the microchip is wire-bonded to the electrically conductive transmission line. The microchip may be a sensor chip disposed in a MEMS sensor package. The electrically conductive transmission lines may be connected at one end to a standard electrical connector.

Another embodiment of the invention provides a MEMS package including a high pressure fitting having an internal cavity, an electrical feedthru disposed in the internal cavity, the electrical feedthru having an insulating core with one or more electrical traces extending along the outside thereof. The insulating core comprises one or more channels disposed therein, such that the one or more electrical traces is substantially flush with the insulating core. The electrical feedthru may include a polymer mold disposed over the insulating core and the electrical traces for sealing between two distinct environments. The polymer mold is preferably sized to fit in a standard swage lock. The MEMS package may also include a bellows containing a secondary fluid disposed within a first end the internal cavity, the secondary fluid in direct fluid communication with the sensor chip. Further, the insulating core comprises an axial centerline, and according to some embodiments at least one of the electrical traces is not parallel to the axial centerline.

Another aspect of the invention provides a method of fabricating an electrical feedthru. The method includes providing an electrically insulating core, creating a channel in the core, adding a conductive material to the channel to create an electrical transmission line, and machining the core, the transmission line, or both the core and the transmission line such that the electrical transmission line is flush with the core. The method may also include adding a insulating mold over the core and the electrical transmission line. According to some aspects, the method may include adhering a microchip to an end of the core and wire bonding the microchip to the electrical transmission line. Providing the core may include injection molding a polymer into a geometric shape. Adding the conductive material may include electroplating the core with copper, and machining may thus include removing the copper from the core at locations other than the channel.

Another aspect of the invention provides a method of electrically interfacing between two distinct environments. The method includes inserting an electrical feedthru having one or more electrical traces traversing an exterior of the electrical feedthru between the two distinct environments. The method may also include mechanically sealing-between the two distinct environments with the electrical feedthru without the use of an O-ring. The mechanical seal is facilitated in some embodiments by adding an over-molded polymer to the electrical feedthru. According to some embodiments, the two distinct environments include a high pressure environment in a MEMS package and a low pressure environment in the MEMS package.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Figure 1:
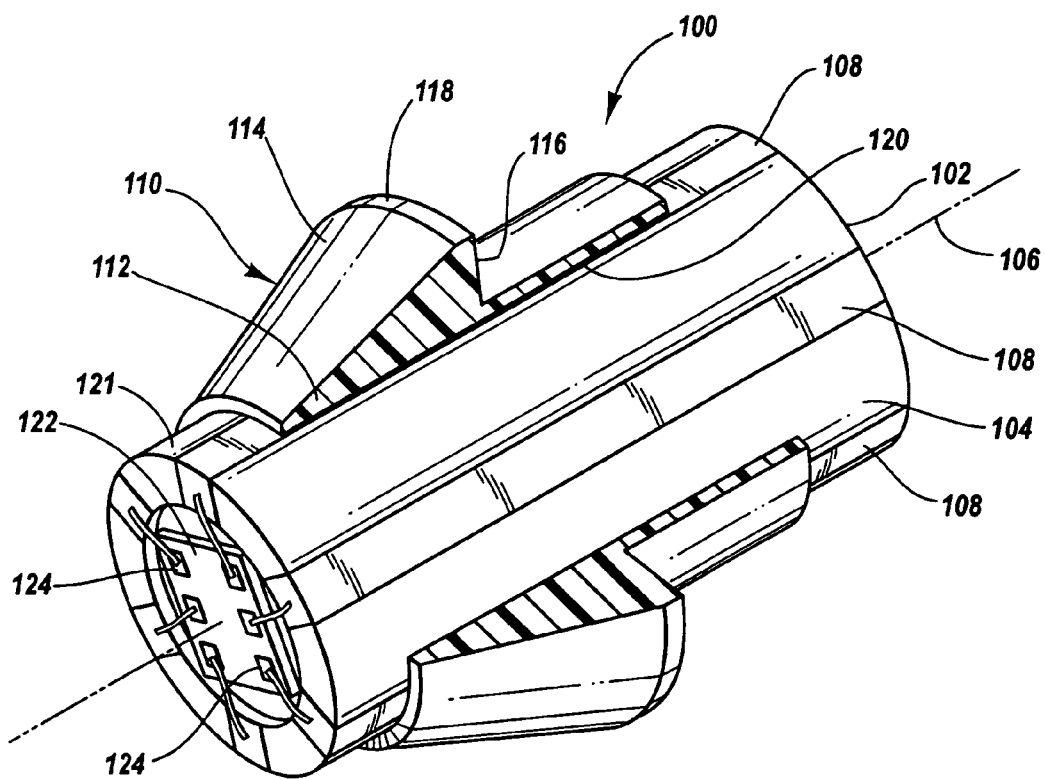
FIG. 1 is a perspective view of an electrical feedthru having external conductive traces according to one embodiment of the present invention.

Throughout the drawings, identical reference numbers and descriptions indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION OF THE PREFERRED EMBODIMENTS

Illustrative embodiments and aspects of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates methods and apparatus for transmitting electrical signals, power transmission, or both between two or more distinct environments. As mentioned in the background, devices used for electrical transmission across two or more distinct environments are commonly referred to as "electrical feedthrus." The principles described herein facilitate electrical feedthrus having one or more transmission lines external, rather than internal, to the feedthru. The use of external transmission lines facilitates smaller electrical feedthru devices that may be used, for example, in a MEMS package. Further, multiple external transmission lines can be spaced around the electrical feedthru devices without increasing the overall size of the feedthru. Some of the methods and apparatus described below are particularly well suited to downhole oilfield applications, but the principles described are not so limited.

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a temperature sensor, a pressure sensor, and a combination tool. "Core" is also broadly to mean the heart or inner part of a thing, especially, but not limited to, a thing having a constant or changing diameter. A "core" does not, however, include a flat plate.

Turning now to the figures, and in particular to FIG. 1, an electrical feedthru (100) according principles of the present invention is shown. The electrical feedthru (100) includes an electrically insulating core, which, according to the embodiment of FIG. 1, is a cylinder (102). The cylinder (102) is preferably an injection molded polymer, although other electrically insulating materials may also be used. The cylinder (102) includes an external surface (104) and an axial centerline (106). An electrically conductive transmission line, which according to FIG. 1 is an electrical trace (108), extends across at least a portion of the external surface (104). According to FIG. 1, there are a plurality of similar or identical electrical traces (108), each traversing the external surface (104) of the cylinder (102). The electrical traces (108) are spaced equally about the outer diameter of the cylinder (102) and extend substantially parallel to the axial centerline (106) of the cylinder (102). However, the electrical traces (108) are not necessarily parallel to the axial centerline (106) as shown in other embodiments described below. The electrical traces (108) are preferably copper, although other conductive materials may also be used.

Continuing to refer to FIG. 1, an insulating mold (110) is disposed over the cylinder (102) and the electrical traces (108). The insulating mold (110) is shown in a cut-away view in FIG. 1, but preferably circumnavigates the cylinder (102) and the electrical traces (108). The insulating mold (110) comprises a polymer such as PEEK (polyetheretherketone) or other insulating material. The insulating mold (110) is shown extending only partially along the cylinder (102) longitudinally. However, according to some embodiments the insulating mold (110) may traverse the entire length of the cylinder (102) or even extend beyond the extents thereof.

The insulating mold (110) includes a first end (112) and comprises a wedge (114). The wedge (114) increases in diameter from the first end (112) toward a shoulder (116) and facilitates a mechanical lock between distinct environments as shown and described in more detail below with reference to FIG. 3. The wedge (114) may include a first segment (118) at the shoulder (116), however, that is of constant diameter. The shoulder (116) of the insulating mold (110) provides a surface against which a nut or other tightening fastener may bear in order to force the wedge (114) into a mechanical seal. The wedge (114) is shaped to fit into a standard swage lock. The insulating mold (110) is preferably injection molded to the cylinder (102) and the electrical traces (108) such that an interface (120) therebetween is sealed even at high temperatures and pressures. High temperatures include temperatures at or above about 150° C. and high pressures include pressures at or above approximately 10,000 psi. Therefore, the insulating mold (110) will not slide or rotate with respect to the cylinder (102) once it is molded thereto.

According to the embodiment of FIG. 1, the cylinder (102) includes a first end (121) with a microchip adhered thereto. The microchip may be, for example, a sensor chip (122) as shown. The sensor chip (122) includes one or more sensors (124), and each sensor (124) is wire-bonded to an associated one of the electrical traces (108). Therefore, data from the sensor chip (122) may be communicated via the electrical traces (108) between distinct environments. Further, power or any electrical transmissions to the chip (122) or other devices may be made across the distinctive environments via the electrical traces (108). Especially when used with a microchip, the cylinder (102) may be quite small. According to some embodiments the cylinder (102) may have a volume of about 0.020 to 0.100 cubic inches, or even smaller. However, much larger cylinders may also be made according to the principles described herein, including some that exceed 1.0 cubic inch in volume.

Figure 2:
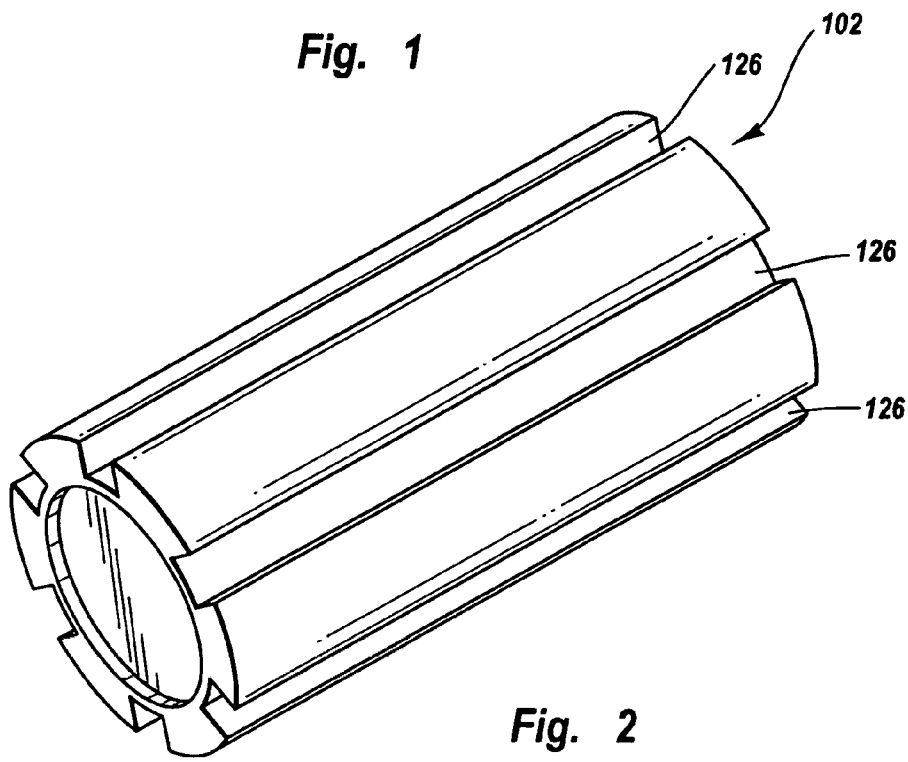
FIG. 2 is a perspective view of a core of the electrical feedthru shown in FIG. 1 according to one embodiment of the present invention.

The electrical traces (108) are flush with the external surface (104) according to the embodiment of FIG. 1. Therefore, the cylinder (102) or other core includes one or more channels (126) as shown in FIG. 2. FIG. 2 illustrates the cylinder (102) prior to the addition of the electrical traces (108) and the insulating mold (110). The channels (126) are preferably integrally created as the cylinder is injection molded, however, they may also be milled or cut into a cylinder or other shape as well. The channels (126) preferably range between approximately 0.005 and 0.010 inches in depth, most preferably about 0.007 inches. A conductive material such as copper is added to the channels (126) to create the electrical traces (108, FIG. 1).

According to some embodiments, the electrical traces (108, FIG. 1) are added to the channels (126) by electroplating. Therefore, the cylinder (102) may be dipped into a metallic solution and plated with a metal. The metal is thereby bonded to the external surface (104) of the cylinder (102), including a thickness of metal disposed in the channels (126). The cylinder (102) is thereafter machined to insulate the electrical traces (108, FIG. 1) from one another and create the flush arrangement between the external surface (104) and the electrical traces (108, FIG. 1). According to the embodiment of FIG. 1, all or substantially all of the metal added to the cylinder (102) is removed, except for the portions of metal disposed in the channels (126, FIG. 2). However, some metal may also be machined from the channels (126, FIG. 2) as well to create a smooth, flush arrangement between the traces (108) and the cylinder (102) or other core. By adding the electrical traces (108) to the exterior of the cylinder (102), many electrical connections across two distinct environments may be made with a single feedthru without increasing the size of the core. The embodiment of FIG. 1 illustrates six electrical traces (108), however, the principles described herein may be applied to create fewer or additional traces in the cylinder (102) as desired.

Figure 3:
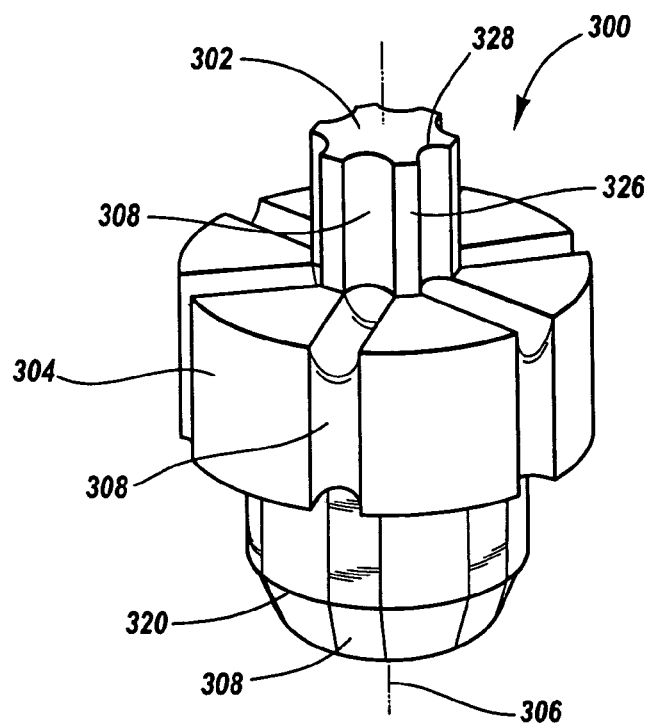
FIG. 3 is a perspective view of another electrical feedthru device having external electrical transmission lines according to one embodiment of the present invention.

While the embodiment shown in FIG. 1 illustrates the generally cylindrical feedthru (100), the geometry of electrical feedthrus having external transmission lines according to the principles described herein is not limited to anything specific. Electrical feedthrus may be arranged according to the described principles in any convenient geometry. For example, FIG. 3 illustrates another electrical feedthru (300). The electrical feedthru (300) of FIG. 3 includes an insulating core (302) or rod of multiple or varying diameters. The insulating core (302) also includes an axial centerline (306). A plurality of electrical traces (308) traverse an external surface (304) of the core (302), however, unlike the embodiment of FIG. 1, the electrical traces (308) are not planar or parallel to the axial centerline (306). Instead, the electrical traces (308) follow the external surface (304) across the multiple changes in diameter. In addition, a first end (320) of the core (302) is tapered, and a second end (326) is splined. The splines may include rounded recesses (328) receptive of a standard electrical connector (450, FIG. 4). Further, although not shown in FIG. 3, the mold (110) of FIG. 1 (or an alternative shape matching the external surface (304)) may seal over the core (302) and the electrical traces (308).

Figure 4:
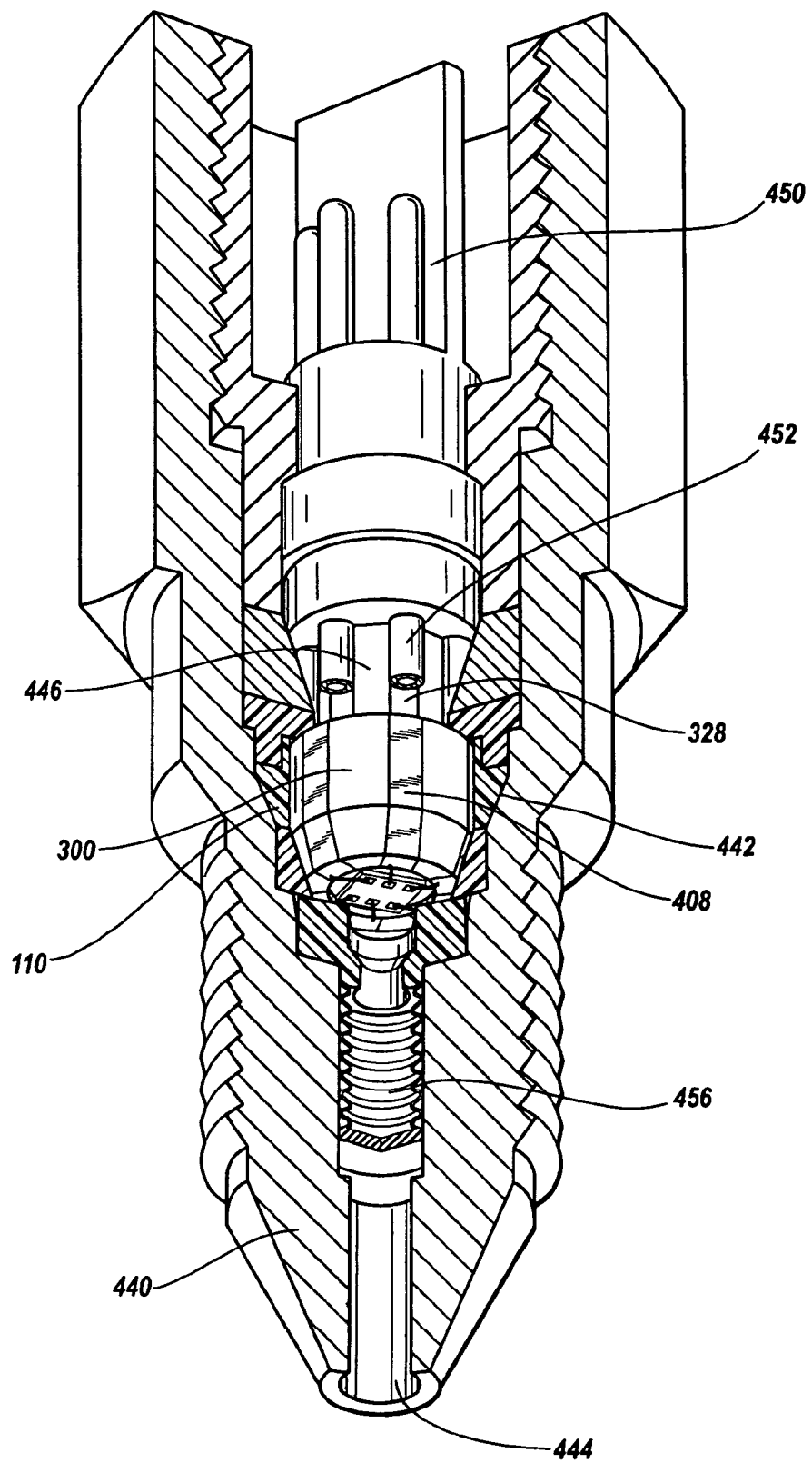
FIG. 4 is a cutaway view of the electrical feedthru shown in FIG. 3 packaged in MEMS device according to another embodiment of the present invention.

FIG. 4 illustrates the electrical feedthru (300) of FIG. 3 in a specific application according to one embodiment of the present invention. As shown in FIG. 4, one particularly well-suited application for the electrical feedthru (300) is a MEMS sensor package. The MEMS sensor package shown in FIG. 4 is a standard high pressure fitting (440) that may be, for example, mounted to a downhole tool. The high pressure fitting (440) includes an internal cavity having a standard swage lock (442) receptive of the insulating mold (110). The insulating mold (110) is forced into engagement with the swage lock (442) to form a mechanical seal between a first or high pressure environment (444) and a second or low pressure environment (446). A standard electrical connector (450) is electrically connected to the electrical traces (308) of the electrical feedthru (300) such that each pin (452) slides into an associated recess (328, FIG. 3) in a tight fit. As shown more clearly in FIG. 3, the recesses (328) comprise a segment of the electrical traces (308) and thus provide electrical communication or power therethrough and to the standard electrical connector (450). According to some embodiments, each pin (452) of the electrical connector (450) may also be welded to the associated electrical traces (308), but this is not necessarily so. Therefore, the principles of the present invention may be advantageously applied in a micro-scale to provide multiple electrical feedthru traces across distinct environments while also facilitating use of standard electrical connectors.

MEMS packaging such as the standard high-pressure fitting (440) may also include additional or alternative components, such as a bellows (456) containing a secondary fluid in direct fluid communication with the sensor chip (122). Further, many other MEMS devices quite different from the fitting (440) shown may also incorporate an electrical feedthru according to principles of the present invention. The embodiment of FIG. 4 is therefore exemplary in nature, and not limiting.

Figure 5:
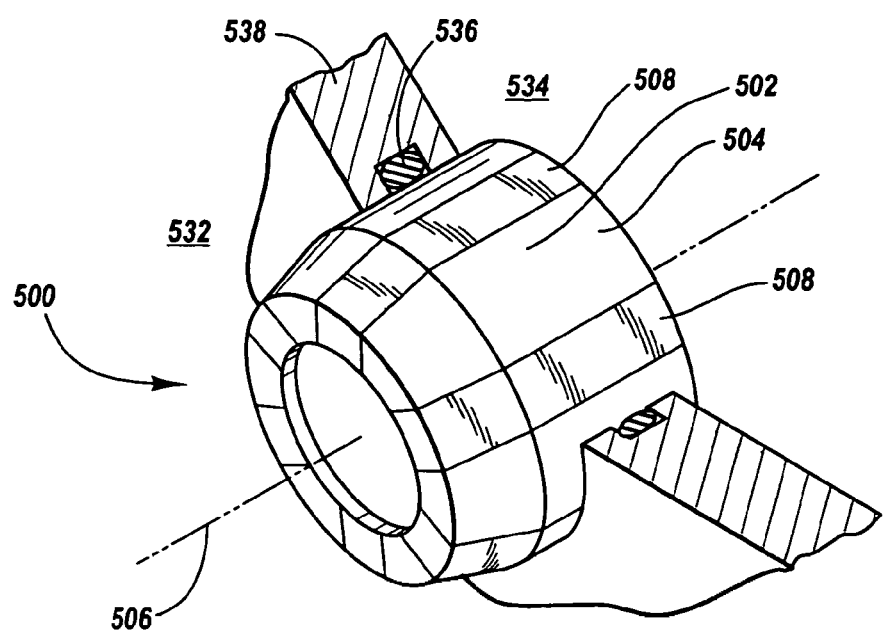
FIG. 5 is a perspective view of another electrical feedthru inserted between two distinct environments according to one embodiment of the present invention.

FIG. 5 illustrates another embodiment of an electrical feedthru (500) placed between two distinct environments (532, 534). The electrical feedthru (500) of FIG. 5, however, does not include the mold (110, FIG. 1). Instead, the electrical feedthru (500) is sealed by an O-ring (536) disposed in a barrier (538) between the first and second environments (532, 534). However, according to some embodiments, the mold (110, FIG. 1) is included and the O-ring is not. The electrical feedthru (500) of FIG. 5 includes an insulating core, which is a tapered disk (502) having a central axis (506), and a plurality of electrical traces (508) traversing an external surface (504) of the tapered disk (502). Similar to the embodiment of FIG. 3, the electrical traces (508) are not parallel to the central axis (506) because of the taper in the disk (502). The electrical traces (508) are, however, flush with the external surface (504) such that the O-ring (536) provides an effective seal between the two distinct environments (532, 534). The electrical feedthru (500) may be used between any two distinct environments to provide electrical communication therethrough.

The preceding description has been presented only to illustrate and describe the invention and some examples of its implementation. It is not intended to be exhaustive or to limit the invention to any precise form disclosed. Many modifications and variations are possible in light of the above teaching. The principles described herein may be used to create any electrical feedthru device with electrical traces traversing the outside, rather than the inside, of the device.

The preferred aspects were chosen and described in order to best explain the principles of the invention and its practical application. The preceding description is intended to enable others skilled in the art to best utilize the invention in various embodiments and aspects and with various modifications as are suited to the particular use contemplated. It is intended that the scope of the invention be defined by the following claims.

What is claimed is:

1. An electrical feedthru apparatus comprising:
   a core comprising an electrical insulator, the core having an external surface;
   an electrically conductive transmission line disposed across a portion of the external surface;
   a microchip adhered to the core, wherein the microchip is electrically connected to the electrically conductive transmission line.

2. The electrical feedthru apparatus of claim 1, further comprising:
   an insulating mold disposed around the electrically conductive transmission line and the external surface.

3. The electrical feedthru apparatus of claim 2, wherein the mold comprises PEEK (polyetheretherketone).

4. The electrical feedthru apparatus of claim 1, wherein the core comprises an axial centerline, and wherein at least a portion of the electrically conductive transmission line is not parallel to the axial centerline.

5. The electrical feedthru apparatus of claim 1, wherein the core is generally cylindrical.

6. The electrical feedthru apparatus of claim 1, wherein the core comprises injection molded plastic.

7. The electrical feedthru apparatus of claim 1, further comprising a plurality of electrically conductive transmission lines spaced around the external surface.

8. The electrical feedthru apparatus of claim 1, wherein the electrically conductive transmission line is connected to a standard electrical connector.

9. The electrical feedthru apparatus of claim 1, wherein the electrically conductive transmission line is substantially flush with the external surface.

10. The electrical feedthru apparatus of claim 1, wherein the electrically conductive transmission line comprises copper.

11. The electrical feedthru apparatus of claim 1, wherein the microchip is wire-bonded to the electrically conductive transmission line.

12. An electrical feedthru apparatus comprising:
    a core comprising an electrical insulator, the core having an external surface;
    an electrically conductive transmission line disposed across a portion of the external surface; and
       a sensor chip adhered to the core, wherein the sensor chip is electrically connected to the electrically conductive transmission line.

13. The electrical feedthru apparatus of claim 12, wherein the sensor chip is wire-bonded to the electrically conductive transmission line.

14. An electrical feedthru apparatus comprising:
    a core comprising an electrical insulator, the core having an external surface;
    an electrically conductive transmission line disposed across a portion of the external surface;
    a channel formed in the external surface, wherein the electrically conductive transmission line is disposed in the channel and bonded thereto.

15. An electrical feedthru apparatus, comprising:
    a core comprising an electrical insulator, the core having an external surface;
    an electrically conductive transmission line disposed across a portion of the external surface;
    an insulating mold disposed over the electrically conductive transmission line and the external surface;
    wherein the mold is shaped to fit into a swage lock.

16. An electrical feedthru apparatus comprising:
    a core comprising an electrical insulator, the core having an external surface;
    an electrically conductive transmission line disposed across a portion of the external surface; and
    an insulating mold disposed over the electrically conductive transmission line and the external surface;
    wherein the mold comprises a wedge.

17. An electrical feedthru apparatus comprising:
    a core comprising an electrical insulator, the core having an external surface;
    an electrically conductive transmission line disposed across a portion of the external surface; and
    an insulating mold disposed over the electrically conductive transmission line and the external surface;
    wherein the mold comprises a shoulder bearing against a tightening fastener.

18. An electrical feedthru apparatus comprising:
    a core comprising an electrical insulator, the core having an external surface;
    an electrically conductive transmission line disposed across a portion of the external surface; and
    a microchip adhered to the core and electrically connected to the electrically conductive transmission line;
    wherein the core, the electrically conductive transmission line, and the microchip are disposed in a MEMS sensor package.

19. An electrical feedthru apparatus comprising:
    a core comprising an electrical insulator, the core having an external surface;
    a plurality of electrically conductive transmission lines spaced around the external surface;
    an insulating mold disposed over the electrically conductive transmission lines and the external surface;
    a sensor chip adhered to the core, wherein the sensor chip is electrically connected to two or more of the plurality of conductive transmission lines.

20. An apparatus comprising:
    an electrical feedthru, the electrical feedthru comprising:
    a core comprising an electrical insulator, the core having an external surface;
    an electrically conductive transmission line disposed across a portion of the external surface;
    an insulating mold disposed over the electrically conductive transmission line and the external surface;
    wherein the core comprises a rod having a first diameter and a shoulder wherein the rod comprises a second diameter larger than the first diameter.

21. An apparatus comprising:
    an electrical feedthru, the electrical feedthru comprising:
       a disk comprising an electrical insulator, the disk having an external surface; and
       a plurality of electrically conductive transmission lines disposed across a portion of the external surface;
       the disk extending between first and second distinct environments;
       an insulating over-mold disposed over the disk.

22. An apparatus comprising:
    an electrical feedthru, the electrical feedthru comprising:

a disk comprising an electrical insulator, the disk having an external surface; and a plurality of electrically conductive transmission lines disposed across a portion of the external surface;

the disk extending between first and second distinct environments;

a plurality of channels disposed in the external surface, wherein each of the plurality of electrically conductive transmission lines is disposed in one of the plurality of channels and is bonded thereto.

23. An apparatus comprising:

an electrical feedthru, the electrical feedthru comprising:

a disk comprising an electrical insulator, the disk having an external surface; and a plurality of electrically conductive transmission lines disposed across a portion of the external surface;

wherein the disk comprises a central axis and a gradually tapered first end; and wherein the plurality of electrically conductive transmission lines is not parallel to the central axis.

24. An electrical feedthru apparatus comprising:

a disk comprising an electrical insulator, the disk having an external surface;

a plurality of electrically conductive transmission lines disposed across a portion of the external surface;

a wedge-shaped insulating over-mold.

25. An apparatus comprising:

an electrical feedthru, the electrical feedthru comprising:

a disk comprising an electrical insulator, the disk having an external surface; and a plurality of electrically conductive transmission lines disposed across a portion of the external surface;

the disk extending between first and second distinct environments;

wherein the disk and the plurality of electrically conductive transmission lines extend between two distinct environments of different pressure.

26. An apparatus comprising:

an electrical feedthru, the electrical feedthru comprising:

a core comprising an electrical insulator, the core having first and second ends and an external surface;

a plurality of electrically conductive transmission lines disposed across a portion of the external surface;

wherein the first end comprises a gradual taper and the second end is splined.

27. An electrical feedthru apparatus, comprising:

a core comprising an electrical insulator, the core having an external surface;

an electrically conductive transmission line disposed across a portion of the external surface;

a microchip adhered to the core, wherein the microchip is electrically connected to the electrically conductive transmission line;

a channel formed in the external surface, wherein the electrically conductive transmission line is disposed in the channel and bonded thereto.

* * * * *